(12) United States Patent
Magnusson et al.

(10) Patent No.: US 10,789,336 B2
(45) Date of Patent: Sep. 29, 2020

(54) ACCESS MANAGEMENT FOR DIGITAL CONTENT

(71) Applicant: Telia Company AB, Solna (SE)

(72) Inventors: Nils-Goran Magnusson, Nynashamn (SE); Rickard Damm, Nacka (SE)

(73) Assignee: TELIA COMPANY AB, Solna (SE)

( * ) Notice: Subject to any disclaimer, the term of this patent is extended or adjusted under 35 U.S.C. 154(b) by 239 days.

(21) Appl. No.: 15/479,599

(22) Filed: Apr. 5, 2017

(65) Prior Publication Data
US 2017/0289308 A1    Oct. 5, 2017

(30) Foreign Application Priority Data
Apr. 5, 2016   (FI) .................................... 20165292

(51) Int. Cl.
*G06F 21/10*    (2013.01)
*H04L 29/06*    (2006.01)
(Continued)

(52) U.S. Cl.
CPC .......... *G06F 21/10* (2013.01); *H04L 63/0876* (2013.01); *H04L 63/107* (2013.01);
(Continued)

(58) Field of Classification Search
CPC ......... H04L 67/00; H04L 67/02; H04L 67/06; H04L 67/14; H04L 67/141; H04L 67/18;
(Continued)

(56) References Cited

U.S. PATENT DOCUMENTS 6,307,837 B1 * 10/2001  Ichikawa ............ H04L 63/0236
                                                                370/230
6,845,400 B2    1/2005  Macpherson et al.
(Continued)

FOREIGN PATENT DOCUMENTS

EP         2924944 A1    9/2015

OTHER PUBLICATIONS

CWE—CWE-291—Reliance on IP Address for Authentication (2.8)—2015.*
(Continued)

*Primary Examiner* — Brian J. Gillis
*Assistant Examiner* — Boris D Grijalva Lobos
(74) *Attorney, Agent, or Firm* — Nixon & Vanderhye (57) ABSTRACT

Disclosed is a method for providing access to a digital content for a user device. The method includes receiving information including a public network address of the local area network and an identifier of a subscription, and storing the information in a register; receiving a validation request from a digital content management system; inquiring if the public network address in the validation request exists in the register; and in response to a positive detection of the inquiry further inquiring from a subscription management register if the subscription in question is valid, and in response to a positive detection generating a signal to the digital content management system indicating that the user device is entitled to access the digital content. Also aspects relating to server, a device and a computer program product are introduced.

12 Claims, 4 Drawing Sheets

(51) Int. Cl.
  *H04L 29/08* (2006.01)
  *H04W 8/18* (2009.01)
  *H04W 8/26* (2009.01)
  *H04W 12/08* (2009.01)
(52) U.S. Cl.
  CPC ............ *H04L 67/327* (2013.01); *H04W 8/18* (2013.01); *H04W 8/26* (2013.01); *H04W 12/08* (2013.01); *G06F 2221/0704* (2013.01)
(58) Field of Classification Search
  CPC . H04L 67/20; H04L 67/30–32; H04L 67/327; H04L 63/00; H04L 63/08; H04L 63/0876; H04L 63/0869; H04L 63/10–102; H04L 63/107; G06F 21/00; G06F 21/10
  See application file for complete search history.

(56) References Cited

U.S. PATENT DOCUMENTS

| | | | | |
|---|---|---|---|---|
| 7,080,116 | B2 * | 7/2006 | Purpura | H04L 69/16 |
| | | | | 455/501 |
| 7,325,246 | B1 * | 1/2008 | Halasz | H04W 12/06 |
| | | | | 379/88.17 |
| 7,451,233 | B2 | 11/2008 | Parekh et al. | |
| 7,664,096 | B2 * | 2/2010 | Doherty | H04L 29/06027 |
| | | | | 370/352 |
| 7,673,146 | B2 * | 3/2010 | Wiedmann | H04L 29/12009 |
| | | | | 713/182 |
| 8,171,541 | B2 * | 5/2012 | Pandey | H04L 63/08 |
| | | | | 726/15 |
| 9,288,671 | B2 * | 3/2016 | Coghlan | H04W 12/06 |
| 9,955,406 | B2 * | 4/2018 | Lin | H04W 12/06 |
| 2012/0131147 | A1 * | 5/2012 | Yeung | G06F 15/16 |
| | | | | 709/219 |
| 2013/0023284 | A1 | 1/2013 | Stanger | |
| 2013/0044760 | A1 * | 2/2013 | Harjanto | H04L 67/14 |
| | | | | 370/401 |
| 2013/0053057 | A1 | 2/2013 | Cansino et al. | |
| 2013/0227283 | A1 | 8/2013 | Williamson et al. | |
| 2015/0106517 | A1 * | 4/2015 | Saunders | H04L 63/0428 |
| | | | | 709/225 |
| 2018/0137512 | A1 * | 5/2018 | Georgiadis | H04L 9/3239 |

OTHER PUBLICATIONS

FI Search Report, dated Oct. 7, 2016, from corresponding FI application.

Aug. 15, 2017, EP communication issued for related EP application No. 17164881.

* cited by examiner

ACCESS MANAGEMENT FOR DIGITAL CONTENT

TECHNICAL FIELD OF THE INVENTION

The invention concerns in general the technical field of telecommunications networks. More particularly, the invention concerns digital content management.

BACKGROUND OF THE INVENTION

Currently a demand for digital content grows exponentially. Consumers are increasingly seeking and using digital services in which digital content is used over a communication network, such as Internet.

Management of access to the digital content is an important area in order to provide easy-to-use services to the consumers. First of all, the access to the services shall be easy for consumers, but advantageously the access information provides information for the service providers for offering, or tailoring, the services, such as digital content, in a better way.

There do exist some solutions in which the device used for accessing is recognized and the digital content to be provided is selected according to the device in use. Some other solutions suggest that a location of a user, i.e. the user terminal, is used for selecting the digital content for a consumer. In such an implementation the user device when accessing the digital content service indicates its location in one way or another to the service provider and the service provider's system provides an access to the digital content on that basis.

From the service provider's point of view the existing solution do not offer simple, but at the same time reliable, solution for being confident of a location of a user device requesting access to a digital content. Especially, the service provider's may desire to differentiate their services so that a user may access to one type of digital content, or service, in a first location, but to another type of digital content, or service, in a second location.

Thus, there is need to improve, or replace, the existing solutions and introduce novel approaches for accessing digital content.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a server, a device and a computer program product for providing access to a digital content. Another objective of the invention is that the method, the server, the device and the computer program product for providing access to the digital content enable, at least partly, differentiation of service based on location.

The objectives of the invention are reached by a method, a server, a device and a computer program product as defined by the respective independent claims.

According to a first aspect, a method for providing access to a digital content for a user device is provided wherein the method comprises: receiving, from a device being communicatively coupled to a local area network, information comprising a public network address of the local area network and an identifier of a subscription of the local area network, and storing the information in a register; receiving a validation request from a digital content management system wherein the validation request comprises information representing a public network address obtained from an access right request received by the digital content management system from the user device; inquiring, from the register, if the public network address in the validation request exists in the register maintaining information received from the device being communicatively coupled to the local area network; in response to a detection that the public network address in the validation request exists in the register inquiring, by including the identifier of the subscription corresponding to the public network address in the inquiry, from a subscription management register if the subscription in question is valid; and in response to a detection that the subscription is valid generating a signal to the digital content management system wherein the signal comprises an indication that the user device is entitled to access the digital content.

The information comprising a public network address of the local area network and an identifier of a subscription of the local area network may be received either once or in a repetitive manner. The information may be received repetitively in response to a renewal of the public network address.

According to a second aspect, a server for providing access to a digital content for a user device is provided, wherein the server comprises at least one processor; at least one memory including computer program code; and wherein the at least one memory and the computer program code configured to, with the at least one processor, cause the server to perform: receive, from a device being communicatively coupled to a local area network, information comprising a public network address of the local area network and an identifier of a subscription of the local area network, and store the information in a register; receive a validation request from a digital content management system wherein the validation request comprises information representing a public network address obtained from an access right request received by the digital content management system from the user device; inquire, from the register, if the public network address in the validation request exists in the register maintaining information received from the device being communicatively coupled to the local area network; inquire, in response to a detection that the public network address in the validation request exists in the register, by including the identifier of the subscription corresponding to the public network address in the inquiry from a subscription management register if the subscription in question is valid; and generate, in response to a detection that the subscription is valid, a signal to the digital content management system wherein the signal comprises an indication that the user device is entitled to access the digital content.

The server may be caused to perform: receive the information comprising a public network address of the local area network and an identifier of a subscription of the local area network either once or in a repetitive manner. The server may be caused to perform: receive the information repetitively in response to a renewal of the public network address.

According to a third aspect, a device being communicatively coupled to a local area network is provided wherein the device comprises: at least one processor; at least one memory including computer program code; wherein the at least one memory and the computer program code configured to, with the at least one processor, cause the device to perform: transmitting information comprising a public network address of the local area network and an identifier of a subscription of the local area network.

The identifier of the subscription may be stored in the at least on memory of the device.

The device may be configured to transmit the information repetitively.

According to fourth aspect, a computer program product comprising program code portions for performing the steps of the method according to the first aspect is provided when the computer program product is executed by at least processor of a computing device.

The computer program product may be stored on a computer-readable recording medium.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
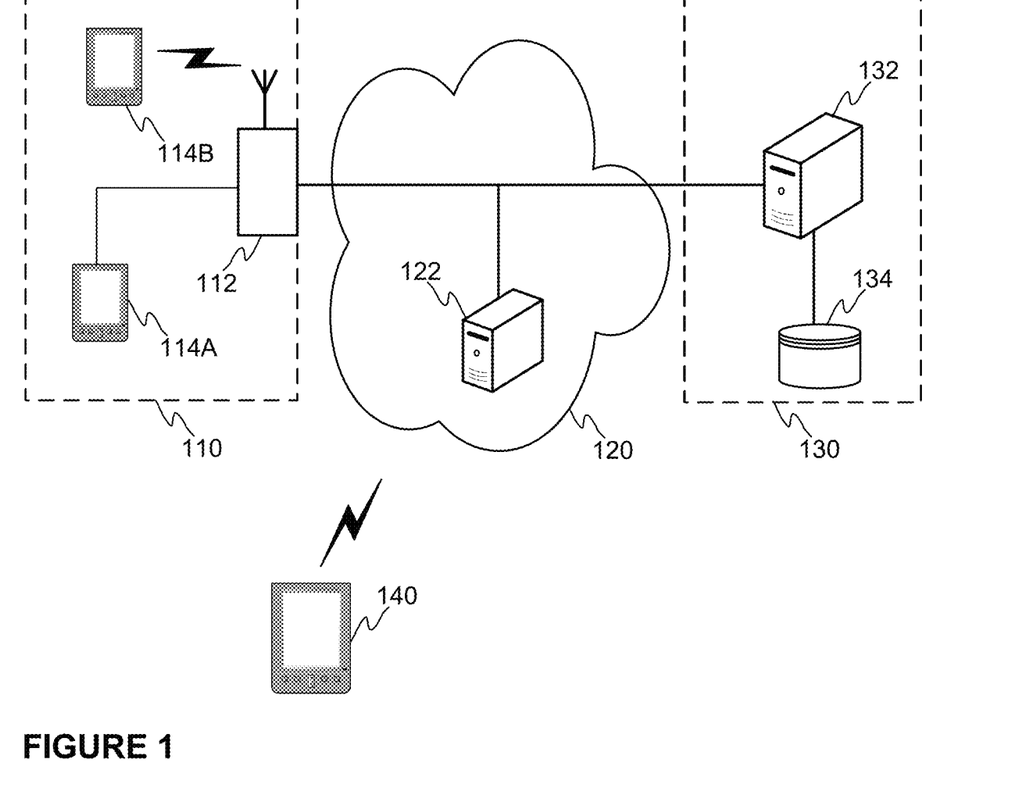
FIG. 1 illustrates schematically an example of a network environment in which the present invention is implemented.

FIG. 1 illustrates schematically an example of a network environment into which the present invention may be implemented. The environment comprises a local area network (LAN) 110 that is connected to a communication network 120, such as an Internet, through a modem device 112 advantageously residing in a facility wherein the LAN 110 is implemented to. The LAN may be either implemented wirelessly, with e.g. Wi-Fi technology, or in a wired manner. In the example of FIG. 1 the modem device 112 comprises necessary units and functions to operate as a router for wired and wireless communication in the LAN 110. Within the operational area of the LAN one or more communication devices 114A, 114B may get access to the communication network 120 through the LAN 110. The network environment comprises also a digital content management system 130. The system may comprise a server 132 that has access to database 134 storing the digital content. The LAN 110 and the digital content management system 130 are communicatively coupled to a validation server 122 connected to the communication network 120. The operation of the validation server 122 will be described in more detail later. The communication device may e.g. be a user terminal used in the home LAN. Some non-limiting examples of the communication device are a personal computer, laptop computer, tablet computer, smart phone and so on.

The communication network connection 120 is subscribed by a user from a service provider, such as a telecom network. As a result, the service provider maintains subscriber related information which may comprise, but is not limited to, an identifier that is typically unique for each subscriber on some basis. Moreover, the service provider grants a public network address, such as public IP address, to the subscriber, or more specifically to the device that interfaces the communication network, such as the modem 112 in FIG. 1. The public network address may be static or dynamic depending on a network implementation by the service provider.

FIG. 1 illustrates also a user device 140 that is mobile in nature and carried by a user. The user device 140 may also communicate with the communication network 120 and utilize services provided therefrom. The communication may be performed over mobile communication network or over some local area network (not shown in FIG. 1). Now, the digital content service provider operating the digital content management system 130 may be willing to provide the user of the user device 140 different service, such as digital content, when the user accesses to the digital content management system from the LAN 110, called home LAN from now on, or when the user accesses to the digital content management system from some other location. As an example of a different service one may consider an access to a music database from where the user may select any album to be played when the user resides in the home LAN 110, but when he/she is traveling outside home LAN the service provider allows only playing some random list. In order to enabling to do this kind of differentiation the service provider of the digital service may determine, with an improved probability, if the user device 140 resides in the home LAN with the solution according to the present invention, as will now be described by referring to FIG. 2. For sake of clarity, the user device 140 may e.g. be a laptop computer, tablet computer, smart phone or any other similar device that may perform the operation as described.

Figure 2:
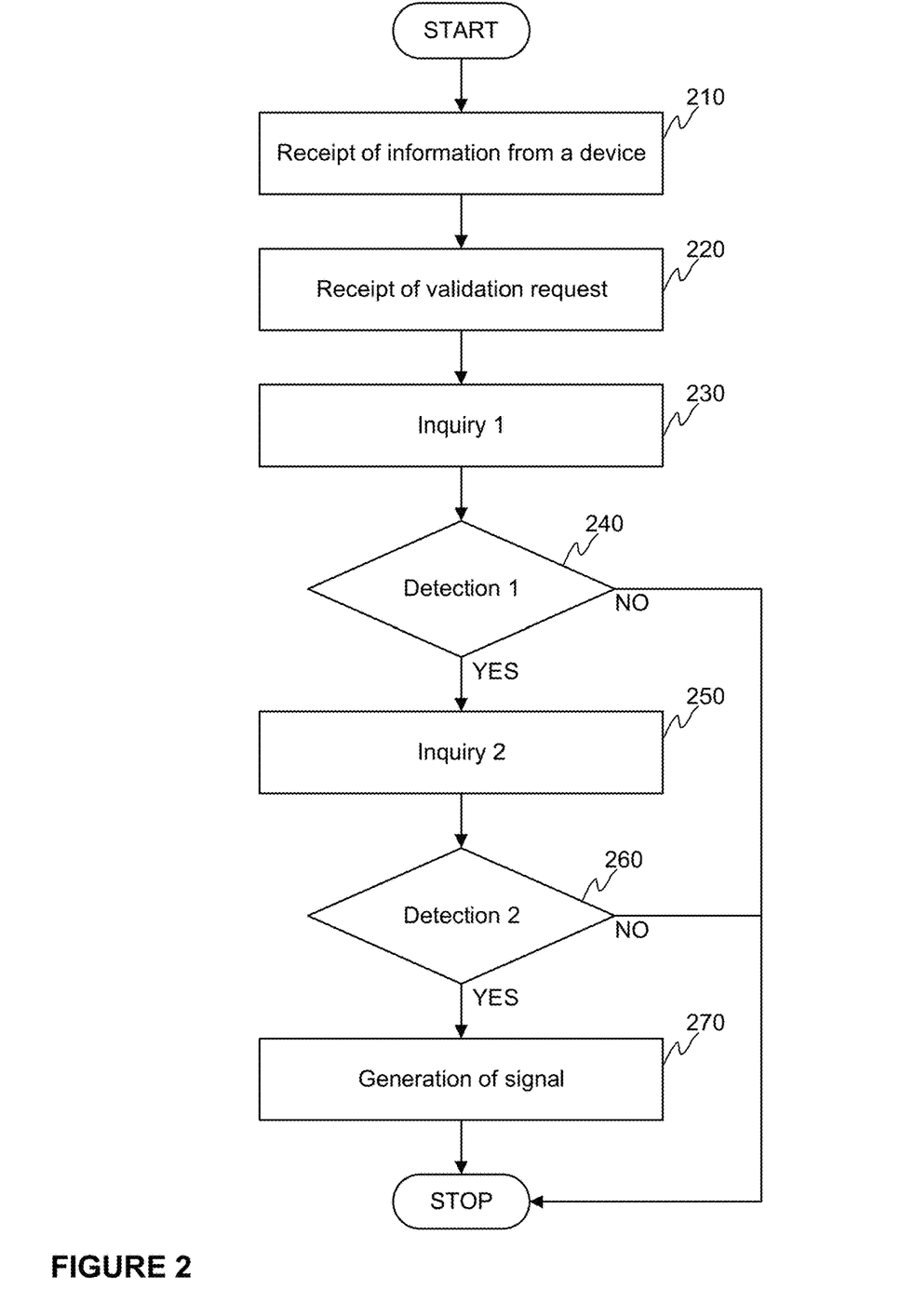
FIG. 2 illustrates schematically an example of a method according to an embodiment of the invention.

FIG. 2 illustrates schematically a method according to an embodiment of the invention. The method is described from the validation server 122 point of view. As mentioned the validation server 122 may be managed by a service provider of the subscription to access the communication network 120 from the home LAN 110. The validation server 122 advantageously maintains, or is at least partly involved in the maintenance, of information on public network addresses from which public network address there exists data traffic.

The solution according to the present invention is based on an idea that a device, such as a communication device 114A, 114B, residing in an operational area of a home LAN network 110 and using a communication service provided by the home LAN 110 is configured to transmit information, e.g. by generating a message, comprising a public network address of the home local area network 110 and an identifier of a subscription of the local area network. The device configured to transmit the information is equipped with necessary means and information, such as with the destination address, to perform the transmit of the information. The information is received 210 by the validation server 122 that is configured to store the received information, i.e. the identifier with the public network address, in a register. The register may be implemented in a memory of the validation server 122 or in a separate entity, such as a database implementation accessible by the validation server 122. The device configured to transmit said information to the validation server 122 may e.g. be the communication device being connected to the home LAN 110 or it may be the modem 112 coupling the home LAN 110 to the communication network 120. In both cases the device in question may be configured to operate as described by implementing instructions to cause the device to operate accordingly with a computer program code that is executed by a processing unit, such as with one or more processors, of the device. Moreover, the device in question may store the identifier of the subscription in a memory. The identifier may be obtained from the memory when the information is transmitted. Further, the device is configured to insert the public network address maintained in the modem and obtainable therefrom in the information to be transmitted. For example, the information may be transmitted in a dedicated message collecting the pieces of information in the message. The transmit of said information may be performed only once or repetitively according to a predetermined schedule. The one-time transmit is applicable if the public network address is static and if the public network address changes dynamically the repetitive transmit of information is advantageous, and in some cases necessary.

The identifier of a subscription of the local area network may refer to a client reference stored in a memory of the device transmitting it, or to an identifier assigned to the device transmitting the information or to an identifier assigned to a software agent transmitting the information. In this application a term identifier of a subscription is used for covering at least the mentioned alternatives as well as any other by means of which a subscriber may either directly or indirectly recognized.

According to an example of the invention the communication device 114A, 114B or the modem device 112 may be configured so that when it is detected that the service provider has assigned a new public network address for the subscription in the dynamic address allocation scheme, the communication device 114A, 114B or the modem device 112 is configured to generate and to transmit information comprising the new public network address of the home local area network 110 and an identifier of a subscription of the local area network. In other words, the triggering of the message generation and transmit is the detection of the new public network address by the communication device 114A, 114B and/or by the modem device 112. Hence, at least some of the mentioned devices may be configured to, e.g. with a portion of computer program code executed by a processor of the corresponding device, to detect the change of the public address and to initiate the procedure as described. Furthermore, the message generated and transmitted may also comprise additional information, such as a time stamp representing the time when the public network address is dynamically updated and/or some performance metrics, for example. Moreover, in some implementation information, such as an identifier, of the device generating and transmitting the information to the validation server may be included in the message. This may be used, by the validation server, for monitoring that the "update" messages come always from the same device. In this manner it is possible to increase security at least partly. The triggering of the generation and transmit of the message may also be implemented so that it is performed according to a specific scheme, e.g. based on time.

At some point of time a user device 140 initiates, either automatically or in response to user action, an access right request towards a digital content management system 130 with an aim to use a service provided by the system 130. The access right request may carry, as is the case in TCP/IP protocol, a public network address of the requesting party to the digital content management system 130. Now, if the user device resides outside the home LAN 110 the public network address is different to the one of the home LAN 110. In other words, if the user device 140 resides in the operational area of the home LAN and is connected thereto, the public network address is the public network address granted to the modem of the home LAN. The user device 140 itself is granted a private network address applicable in the home LAN, but which is not visible outside the home LAN 110. The digital content management system 130 and especially the server 132 is configured to obtain the public network address from the access right request and establish a validation request comprising the obtained public network address and deliver it towards the validation server 122 which piece of information is thus received in the validation server 220.

Next, the validation server 220 is configured to obtain the public network address from the validation request and inquire 250 if the public network address in the validation request exists in the register maintaining information received from the device 114A, 114B being communicatively coupled to the home LAN 110. If no such public network address is found, or detected 240, from the register, the inquiry 250 indicates that the user device 140 does not reside in the home LAN 110, and a negative response may be generated to the digital content management system 130. The negative response may cause the digital content management system 130 to cancel the service provision to the user terminal 140 or at least not allowing the user device 140 to access a certain digital content, or service. Alternatively, at least if the public network address is detected 240 in the register, i.e. the user device 140 resides in the same home LAN 110 as the device 114A, 114B the validation server 122 is configured to obtain the identifier of the subscriber maintained and stored in the register together with the public network address and to perform a further inquiry 250. The further inquiry 250 is performed by including the identifier of the subscription corresponding to the public network address in the inquiry and the inquiry is performed to a subscription management register. The subscription management register may be implemented in a memory of the validation server 122 or in a separate entity, such as a database implementation accessible by the validation server 122. The further inquiry 250 is performed to detect 260 if the subscription in question is valid from service provider's perspective or not. If it is detected 260, based on the information stored in the subscription management register, that the subscription is not valid a negative response may be generated to the digital content management system 130 from the validation server 122. The negative response may cause the digital content management system 130 to cancel the service provision to the user terminal 140 or at least not allowing the user device 140 to access a certain digital content, or service. On the other hand, if it is detected 260 that the subscription is valid, the validation server is configured to generate a signal 270, e.g. in a form of a message, to the digital content management system 130. The signal may comprise an indication that the user device is entitled to access the digital content. In other words, the access is granted to the digital content that caused the digital content management system to initiate the validation procedure as described here. The indication may e.g. be a pre-agreed piece of information stored in the data of the message.

The transmitted pieces of information between the entities being involved in the method may be encrypted if needed. For example, the subscription identifier may be such piece of information that is advantageously encrypted in order to improve a safety of the system. In case some encryption method is used in the solution each party are advantageously arranged to be able to decrypt the encrypted data. The encryption and decryption may be based and implemented with digital certificates wherein in the corresponding entities have necessary keys and methods for performing the encryption and decryption.

Figure 3:
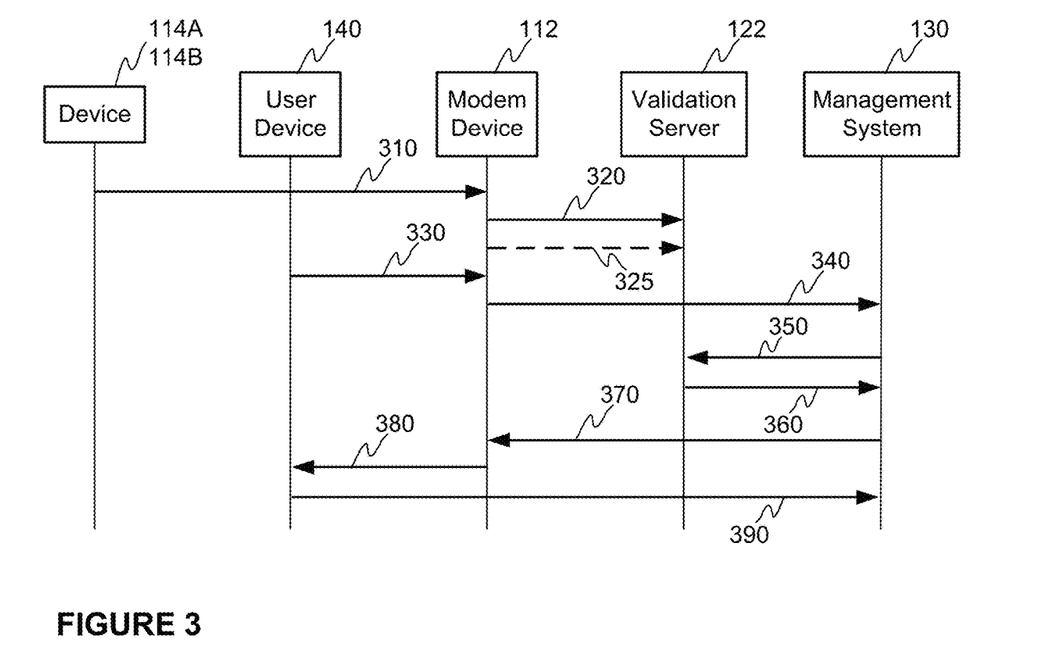
FIG. 3 illustrates schematically an example of a method according to an embodiment of the invention as a flow chart.

FIG. 3 illustrates schematically the method as described as a flow chart disclosing the signaling between the entities belonging to the system. The signaling and the data carried in the signal are examples and may also be implemented in another way within the limits of the present invention as defined in the independent claims. The entities shown in the flow chart are a device 114A, 114B residing in a home LAN, a user device 140 (that in this example resides in the home LAN), a modem device connecting the home LAN to a communication network through service provider systems (not shown in Figures), a validation server 122 and a digital content management system 130. The signals of the flow chart according to the example are the following:

310 and 320: A device 114A, 114B residing and being connected to the home LAN 110 is configured to initiate transmit of information to validation server 122. The device 114A, 114B inside the home LAN is assigned with a private network address and when the signal for transmitting the information to the validation server 122 reaches the modem device 112, the modem device removes the private network address from the signal and adds the public network address to the signal 320. Moreover, the signal advantageously carries an identifier of a subscription by means of which the user may access to the communication network.

(325: The signal 325 in FIG. 3 refers to an implementation where the modem device 112 is configured to deliver the mentioned pieces of information to the validation server 122.)

330 and 340: A user device 140 initiates, either automatically or in response to user action, an access right request towards a digital content management system 130 through the modem device 112 that inputs the public network address to the request.

350: The validation server 122 obtains the public network address from the validation request and detects 240 by inquiring 250, from the validation server 122, if the public network address obtained from the validation request exists in the register maintaining information received from the home LAN. Further, the validation server 122 may also detect 260 by inquiring 250 with the identifier of the subscription corresponding to the public network address if the subscription in question is valid from service provider's perspective or not.

360: In response to detection that an outcome of the first inquiry (or the outcomes of the first inquiry and the second inquiry according to an implementation) is positive the validation server may be configured to generate a signal 270 to the digital content management system 130 wherein the signal is configured to indicate that the user device, or the subscriber in question, is entitled to access the digital content.

370 & 380: The digital content management system 130 advantageously indicates the right to access to the user device 140 e.g. through the modem device. It is worthwhile to note that the indication may also be performed through any other communication channel, because the digital content management system may maintain and store user related information disclosing one or more addresses for contacting the user device 140 or, more specifically, the user of the user device 140.

390: In response of the receipt of the user may access to the digital content residing in the digital content management system 130.

Figure 4:
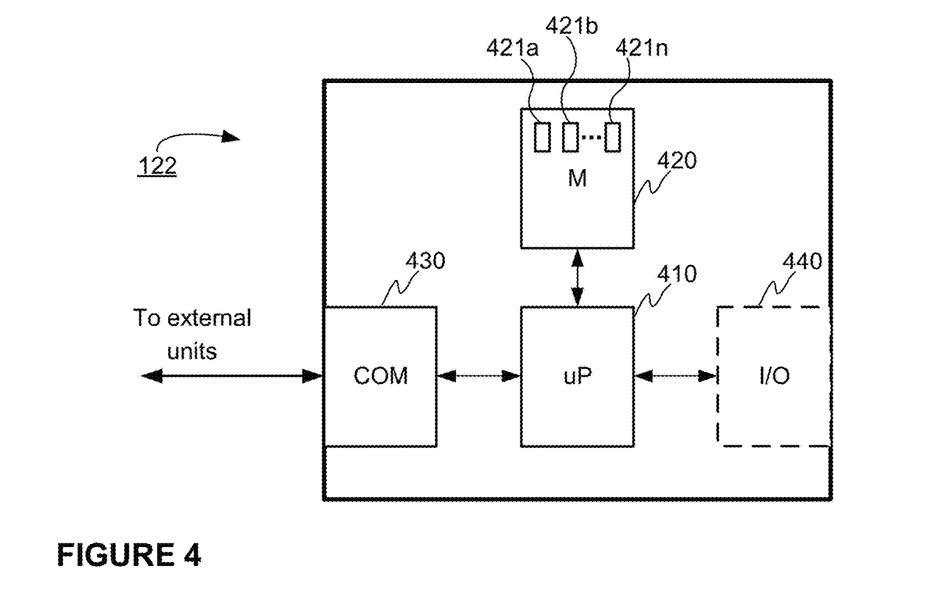
FIG. 4 illustrates schematically an example of a server according to an embodiment of the invention.

FIG. 4 illustrates schematically a validation server 122 according to an example of the invention. The validation server 122 is configured to implement the method as described at least partly. The execution of the method may be achieved by arranging the processor 410 to execute at least some portion of computer program code 421a-421n stored in a memory 420 causing the processor 410, and thus the validation server 122, to implement one or more method steps as described. The processor 410 is thus arranged to access the memory 420 and retrieve and store any information therefrom and thereto. Moreover, the processor 410 is configured to control the communication through the communication interface 430 with any external unit, such as with digital content management system 130, modem device 112, and so on. The processor 410 may also be configured to control the output of information, i.e. data. The processor 410 may also be configured to control overall operability of the validation server according to instructions stored in the memory 420 in a form of computer program code and parameters thereto. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention. Even if it is disclosed that the method may be implemented with one server, it may also be arranged that implementation of the method is performed in multiple servers operatively coupled to each other either directly or indirectly.

Figure 5:
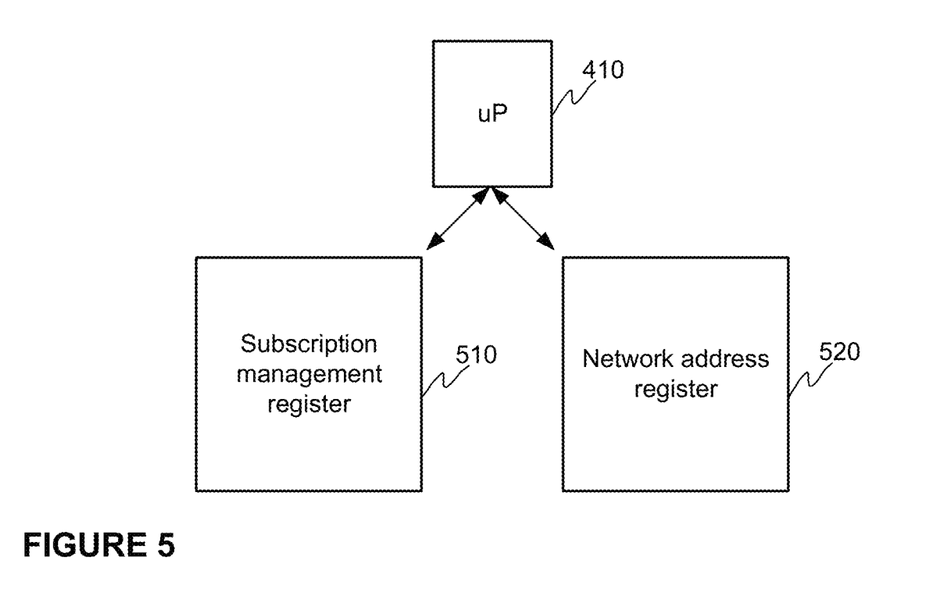
FIG. 5 illustrates schematically some modules being involved in an example of the invention.

FIG. 5 illustrates schematically the modules with whom the processor 410 of the validation server 122 may be communicatively coupled to and with whom the processor 410 of the validation server 122 may perform inquiries as described in order to control, at least partly, an access to a digital content requested by the user. The first module may be a subscription management register maintaining and storing information on valid subscriptions of the service provider offering access to a communication network. The second module may be a network address register 520 that is configured to maintain and store information received from the device 114A, 114B, or in some implementation of the invention from the modem 112, being communicatively coupled to the home LAN 110. As described the information comprises at least an identifier of the subscription and the public network address associated to the identifier. The mentioned modules may be implemented in the validation server 122 internally e.g. as a database or any other implementation in the memory of the validation server. Alternatively or in addition, either one or both of the modules may be implemented as external unit(s) to the validation server 122 into which the validation server 122 may perform inquires in a predetermined manner and in that way to retrieve necessary information for operating as described.

Figure 6:
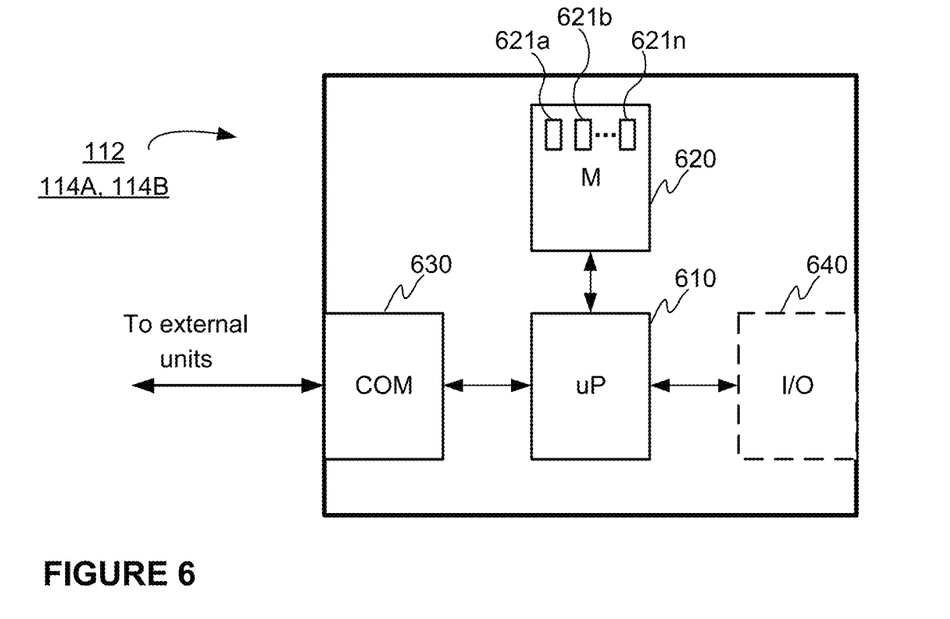
FIG. 6 illustrates schematically a device according to an embodiment of the invention.

FIG. 6 illustrates schematically a device 112, 114A, 114B being communicatively coupled to a local area network through a communication interface 630 arranged in the device. The communication interface 630 may e.g. be implemented with one or more modems implementing communication technology used in the implementation. The device 112, 114A, 114B may further comprise at least one processor 610 and at least one memory 620 including computer program code 621a-621n, which may be executed by the processor 610. The execution of the computer program code cause the device 112, 114A, 114B to perform: at least transmitting information comprising a public network address of the local area network and an identifier of a subscription of the local area network. The identifier of the subscription may be stored in the at least on memory 620 of the device 112, 114A, 114B. Furthermore, a timer may be arranged in the device, either with hardware or software implementation, by means of which it is possible to establish a schedule to transmit the information repetitively to the validation server as described above. The device may also comprise a user interface 640 by means of which it is possible input and output of information. The input and output devices may be any known solutions thereto, such as keyboard, buttons, display, touch display and so on. The device may be the communication device or the modem as described in the present application.

Some aspects of the present invention may also relate to a non-transitory computer-readable storage medium storing at least portions of computer program product comprising portions of computer program code that are executable by a computing device, such as at least one processor of a server, to implement the method steps in a validation server 122 as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a sub-routine, element or other unit suitable for use in a computing environment. A computer program code may be deployed to be executed on one server or on multiple servers at one site or distributed across multiple sites and interconnected by a communication network. This definition comprises also any solutions based on so called cloud computing. The computer program code comprises instructions for causing the server to perform one or more of the method steps as described above.

The described solution according to the invention solves at least partly drawbacks of prior art solutions. Moreover, an advantage of the present invention is that it provides a secure solution in the area as described because it is more or less impossible to abuse due to its nature in which the access is dependent on information, e.g. a network address that may be dynamic, that is managed by a service provider of the subscription to access the communication network. The implementation according to the invention may also enable new business opportunities and licensing models due to its nature between the service provider of the subscription and digital content owners/managers.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for providing access to a digital content for a user device, the method comprising:
    receiving, from a device communicatively coupled to a local area network, information comprising a first public network address of the local area network and an identifier of a subscription of the local area network that is separate from the public network address, and storing the information in a register, the identifier of the subscription being a client reference;
    receiving a validation request from a digital content management system, the validation request comprising information representing a second public network address obtained from an access right request received by the digital content management system from the user device;
    inquiring by a first inquiry, from the register, whether or not the second public network address received in the validation request exists in the register as the first public network address received from the device that is communicatively coupled to the local area network;
    in response to a detection that the second public network address received in the validation request exists in the register as the stored first public network address, inquiring, by including the stored identifier of the subscription stored in the register in a second inquiry, from a subscription management register whether or not the subscription in question is valid; and
    in response to a detection that the subscription is valid, generating a signal to the digital content management system, the signal comprising an indication that the user device is entitled to access the digital content.

2. The method of claim 1, wherein the information comprising the first public network address of the local area network and the identifier of the subscription of the local area network is received either once or in a repetitive manner.

3. The method of claim 2, wherein the information is received repetitively in response to a renewal of the first public network address.

4. The method of claim 1, wherein operations of the method are executed by at least a processor of a computing device using a computer program stored on a non-transitory computer-readable medium.

5. The method of claim 2, wherein operations of the method are executed by at least a processor of a computing device using a computer program stored on a non-transitory computer-readable medium.

6. The method of claim 3, wherein operations of the method are executed by at least a processor of a computing device using a computer program stored on a non-transitory computer-readable medium.

7. A server for providing access to a digital content for a user device, the server comprising:
    at least one processor;
    at least one memory including computer program code;
    the at least one memory and the computer program code configured to, with the at least one processor, cause the server to:
        receive, from a device communicatively coupled to a local area network, information comprising a first public network address of the local area network and an identifier of a subscription of the local area network that is separate from the public network address, and store the information in a register, the identifier of the subscription being a client reference, receive a validation request from a digital content management system, the validation request comprising information representing a second public network address obtained from an access right request received by the digital content management system from the user device, inquire by a first inquiry, from the register, whether or not the second public network address received in the validation request exists in the register as the first public network address received from the device that is communicatively coupled to the local area network, inquire, in response to a detection that the second public network address in the validation request exists in the register as the stored first public network address, by including the stored identifier of the subscription stored in the register in a second inquiry from a subscription management register when the subscription in question is valid, and generate, in response to a detection that the subscription is valid, a signal to the digital content management system, the signal comprising an indication that the user device is entitled to access the digital content.

8. The server of claim 7, wherein the server is caused to:
receive the information comprising the first public network address of the local area network and the identifier of the subscription of the local area network either once or in a repetitive manner.

9. The server of claim 8, wherein the server is caused to:
receive the information repetitively in response to a renewal of the first public network address.

10. A device communicatively coupled to a local area network, the device comprising:
at least one processor;
at least one memory including computer program code;
the at least one memory and the computer program code configured to, with the at least one processor, cause the device to:

transmit, to a server configured to provide access to digital content for a user device, information comprising a first public network address of the local area network and an identifier of a subscription of the local area network that is separate from the public network address, the identifier of the subscription being a client reference, wherein the transmitted information is stored in a register which is inquired by the server by a first inquiry to determine whether or not a second public network address in a validation request received from a digital content management system exists in the register that maintains the transmitted information, information representing the public network address in the validation request being obtained from an access right request received by the digital content management system from the user device, the identifier of the subscription in the transmitted information being used to determine whether or not the subscription in question is valid, in response to a detection that the second public network address received in the validation request exists in the register as the first public network address so that a signal is generated to the digital content management system indicating that the user device is entitled to access the digital content, the server inquires, by including the stored identifier of the subscription stored in the register in a second inquiry, from a subscription management register whether or not the subscription in question is valid, in response to a detection that the second public network address received in the validation request exists in the register as the stored first public network address, and the server generates a signal to the digital content management system, in response to a detection that the subscription is valid, the signal comprising an indication that the user device is entitled to access the digital content.

11. The device of claim 10, wherein the identifier of the subscription is stored in the at least one memory of the device.

12. The device of claim 10, wherein the device is configured to transmit the information repetitively.

* * * * *